United States Patent
Negulescu

(10) Patent No.: US 9,151,223 B2
(45) Date of Patent: Oct. 6, 2015

(54) GAS TURBINE COMBUSTION CHAMBER ARRANGEMENT OF AXIAL TYPE OF CONSTRUCTION

(75) Inventor: Dimitrie Negulescu, Berlin (DE)

(73) Assignee: Rolls-Royce Deutschland Ltd & Co KG (DE)

(*) Notice: Subject to any disclaimer, the term of this patent is extended or adjusted under 35 U.S.C. 154(b) by 230 days.

(21) Appl. No.: 13/704,972

(22) PCT Filed: Jun. 15, 2011

(86) PCT No.: PCT/EP2011/002959
§ 371 (c)(1),
(2), (4) Date: Dec. 17, 2012

(87) PCT Pub. No.: WO2011/157418
PCT Pub. Date: Dec. 22, 2011

(65) Prior Publication Data
US 2013/0086908 A1    Apr. 11, 2013

(30) Foreign Application Priority Data

Jun. 15, 2010 (DE) .......................... 10 2010 023 816

(51) Int. Cl.
*F02C 3/06* (2006.01)
*F02C 3/14* (2006.01)
(Continued)

(52) U.S. Cl.
CPC . *F02C 3/06* (2013.01); *F01D 9/041* (2013.01); *F02C 3/14* (2013.01); *F23R 3/16* (2013.01);
(Continued)

(58) Field of Classification Search
CPC .............. F01D 9/041; F02C 3/06; F02C 3/14; F23R 3/16; F23R 3/50; F23R 3/58; F05D 2240/129; F05D 2250/314; F05D 9/00; F04D 29/444; Y02T 50/671
USPC ............ 60/752, 722, 726, 751; 415/115, 144, 415/145; 416/95, 96 R
See application file for complete search history.

(56) References Cited

U.S. PATENT DOCUMENTS

| 3,000,183 A |   | 9/1961 | Hall |
|---|---|---|---|
| 3,608,310 A | * | 9/1971 | Vaught ............................ 60/752 |

(Continued)

FOREIGN PATENT DOCUMENTS

| BE | 674852 | 1/1966 |
|---|---|---|
| CH | 214256 | 4/1941 |

(Continued)

OTHER PUBLICATIONS

English translation of International Search Report and Written Opinion from related PCT application.

(Continued)

*Primary Examiner* — Phutthiwat Wongwian
*Assistant Examiner* — Carlos A Rivera
(74) *Attorney, Agent, or Firm* — Timothy J. Klima; Shuttleworth & Ingersoll, PLC

(57) ABSTRACT

A gas-turbine combustion chamber arrangement includes a flame tube, a diffuser element arranged upstream of the flame tube in the flow direction, the diffuser element including an annular duct, and an axial compressor arranged upstream of the diffuser element. The diffuser element features an annular guide vane area in which guide vanes are arranged, which for redirecting an incoming flow are provided at an angle ($\alpha$) in a range between 28° and 32° relative to a central axis of the gas turbine. Downstream of the guide vane area, a diffuser area is arranged, the diffuser area not being provided with flow-guiding elements affecting the flow, where burners arranged in the annular combustion chamber are provided with their burner axes at an angle ($\beta$) between 40° and 50° relative to the central axis.

20 Claims, 3 Drawing Sheets

Figure 1:
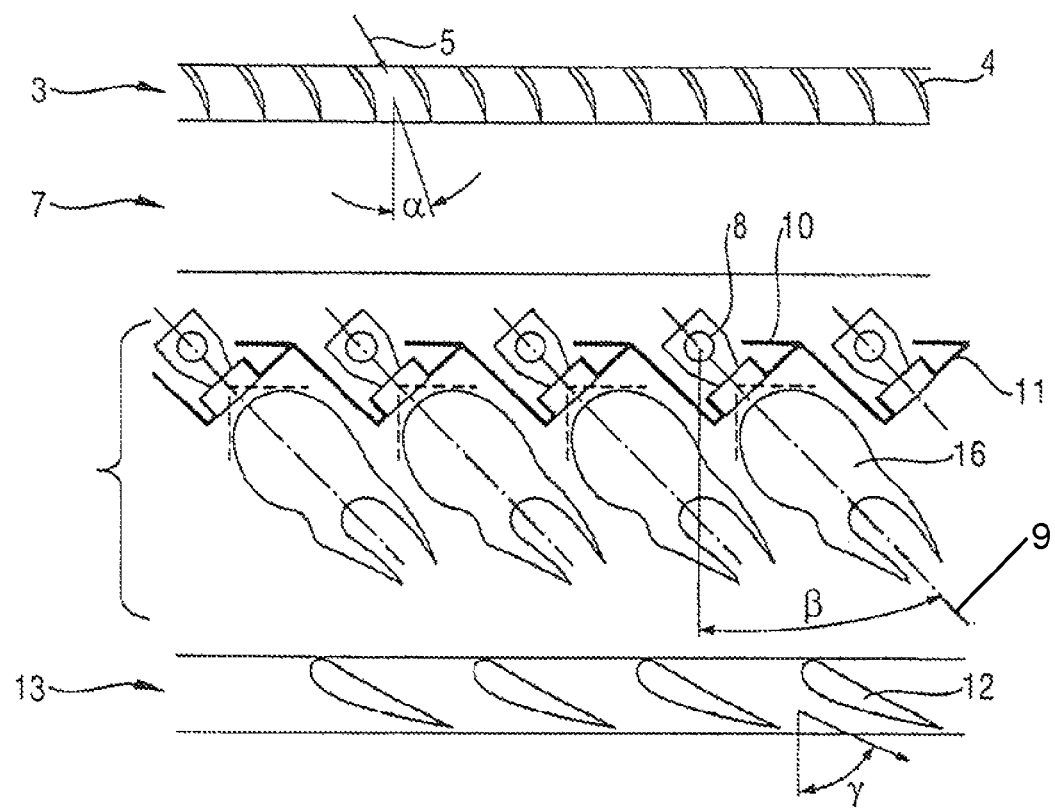

(51) Int. Cl.
  *F23R 3/16* (2006.01)
  *F23R 3/50* (2006.01)
  *F23R 3/58* (2006.01)
  *F01D 9/04* (2006.01)

(52) U.S. Cl.
  CPC ... *F23R 3/50* (2013.01); *F23R 3/58* (2013.01); *F05D 2240/129* (2013.01); *F05D 2250/314* (2013.01); *Y02T 50/671* (2013.01)

(56) References Cited

U.S. PATENT DOCUMENTS

| | | | |
|---|---|---|---|
| 5,220,795 A * | 6/1993 | Dodds et al. | 60/747 |
| 5,241,818 A | 9/1993 | Shekleton et al. | |
| 5,839,283 A | 11/1998 | Doebbeling | |
| 6,192,669 B1 | 2/2001 | Keller et al. | |
| 6,279,322 B1 | 8/2001 | Moussa | |
| 6,488,469 B1 | 12/2002 | Youssef et al. | |
| 7,549,294 B2 * | 6/2009 | Buret et al. | 60/804 |
| 7,716,931 B2 | 5/2010 | Mancini et al. | |
| 7,954,327 B2 | 6/2011 | Pieussergues et al. | |
| 2007/0012048 A1 | 1/2007 | Buret et al. | |
| 2008/0134661 A1 | 6/2008 | Pieussergues et al. | |

FOREIGN PATENT DOCUMENTS

| | | |
|---|---|---|
| DE | 19541303 | 5/1997 |
| DE | 19549143 | 7/1997 |
| EP | 0870990 | 10/1998 |
| EP | 1746348 | 1/2007 |
| EP | 1830129 | 9/2007 |
| FR | 2909748 | 6/2008 |
| WO | 99/56059 | 11/1999 |
| WO | 2007/102807 | 9/2007 |

OTHER PUBLICATIONS

International Search Report dated Aug. 12, 2011 from related PCT application.
German Search Report dated Jun. 6, 2011 from related application.
Jan. 28, 2014 English Translation of Written Opinion of International Search Report dated Nov. 6, 2013 from counterpart Application No. PCT/EP2012/002518.
German Search Report dated May 15, 2012 from counterpart German Application No. 10 2011 108 887.7.
International Search Report dated Nov. 6, 2013 from counterpart International Application No. PCT/EP2012/002518.

* cited by examiner

GAS TURBINE COMBUSTION CHAMBER ARRANGEMENT OF AXIAL TYPE OF CONSTRUCTION

This application is the National Phase of International Application PCT/EP2011/002959 filed Jun. 15, 2011 which designated the U.S. and that International Application was published under PCT Article 21(2).

This application claims priority to German Patent Application No. DE102010023816.3 filed Jun. 15, 2010 and PCT Application No. PCT/EP2011/002959 filed Jun. 15, 2011, which applications are incorporated by reference herein.

This invention relates to a gas-turbine combustion chamber arrangement.

In detail, the invention relates to a gas-turbine combustion chamber arrangement in axial design, usable in particular for an aircraft gas turbine, but also for stationary gas turbines.

It is known from the state of the art that the flow leaving a compressor of the gas turbine is redirected in the axial direction by means of an outlet guide vane. This redirection is necessary for reducing the flow velocities and for an adaptation to the following combustion chamber with a burner axially arranged in the conventional manner. The flow is thus decelerated at the compressor outlet in the outlet guide vane and redirected almost completely in the axial direction. Then the flow passes through a diffuser inside which is it guided in the axial flow direction and decelerated. Following that, the flow passes into a flame tube, or into several flame tubes in the case of an annular combustion chamber of mixed construction, where injection nozzles are arranged which are likewise aligned in the axial direction. The result is flames which also form almost completely in the axial direction. At the combustion chamber outlet, the hot combustion gases are accelerated inside a nozzle guide vane ring to the speed of sound level and at the same time strongly deflected in the turbine rotation direction.

This multiple redirection of the flow means that the combustion chamber or even the entire gas turbine must be of relatively great length. This results in a high combustion chamber weight. Furthermore, a large number of components are needed which can also lead to heavy costs.

A further and crucial drawback is that due to the multiple flow redirections, which add up for example to at least 120°, considerable flow losses result which in turn lead to an increased fuel consumption and hence also result in increased pollutant emissions.

It is known from US 2007/0012048 A1 to retain the inclination angle of the flow exiting the compressor or if necessary to increase it. The injection nozzles, heat shields and the axial walls too of the combustion chamber have inclined angles.

The object underlying the present invention is to provide a gas-turbine combustion chamber arrangement of the type mentioned at the beginning for a gas turbine provided with an axial combustion chamber, which while being simply designed and easily and cost-effectively producible avoids the disadvantages of the state of the art.

It is a particular object of the present invention to provide solution to the above problematics by a combination of the features described herein. Further advantageous embodiments of the invention become apparent from the present description.

It is thus provided in accordance with the invention that the diffuser element forming a part of the combustion chamber arrangement includes two functional areas, i.e. firstly an annular guide vane area which does not turn in full, and a following diffuser area for a constant angular momentum flow (conservation of angular momentum flow).

The invention thus relates to a gas-turbine combustion chamber arrangement having an axial combustion chamber and an axial compressor preferably but not necessarily provided, as described in the following in conjunction with FIG. 4. It is also possible in accordance with the invention to combine a radial compressor with the axial combustion chamber.

The air flow exiting the axial compressor at an inclination angle is redirected in the annular guide vane area by the stator vanes provided there such that the flow is aligned at an angle between 28° and 32°, preferably at an angle $\alpha$ of 30°, to the central axis of the gas turbine. The guide vane thus redirects the flow by approx. 20°, for example from an entry angle of 50° to 30° at the outlet. The air flow with an inclination angle thus reduced then flows through the diffuser area. The latter is designed in accordance with the invention such that no flow-guiding elements affecting the flow are present there. The flow can thus pass through the diffuser without hindrances. The inclination angle of the flow increases here automatically to an inclination angle relative to the longitudinal axis of between 40° and 50°, preferably 45°. The flow thus passes through the outlet area of the diffuser area with an again increased inclination angle and impacts at that angle the burners of the annular combustion chamber, which are arranged inclined at precisely that angle of between 40° and 50°, preferably 45°, relative to the central axis or to the axial direction. The air thus flows through the burners domes without further deflection.

Due to the design in accordance with the invention of the guide vane area, of the diffuser area and the burners, the result inside the annular combustion chamber is a swirl flame which is free of the drawbacks of the state of the art and permits an optimized combustion. This results in a shortened structural length, as compared with the state of the art. To do so, the flame tube height H is made larger than in conventional combustion chambers. This allows the combustion chambers to be designed shorter and lighter in accordance with the invention than the annular combustion chambers known from the state of the art. Since there is less deflection in the diffuser area and less deflection is also necessary in the combustion chamber inlet area, fewer components are needed.

The entire flow redirection, which in the state of the art is at least 120° and leads to considerable flow losses, is reduced to less than 60° by the design in accordance with the invention.

The gas-turbine combustion chamber arrangement in accordance with the invention thus permits the construction of a reduced-length and reduced-weight engine. The result is a considerable cost saving. The gas-turbine combustion chamber arrangement in accordance with the invention is also suitable for improving existing combustion chamber concepts.

It is particularly advantageous in accordance with the invention when the flame tube inlets and heat shields too inside the burner are arranged inclined by the angle of the combustion chamber axis. This ensures an improved flow through the combustion chamber and an improved flame formation.

The annular combustion chamber in accordance with the invention has preferably a ratio of length to height for the flame tube of less than 1.4. This permits a particularly compact design for the gas-turbine combustion chamber arrangement.

It is particularly favourable when the nozzle guide vane ring is provided with nozzle guide vanes designed for further and additional deflection of the flow entering the nozzle guide vane ring at an angle range between 15° and 20°, preferably 17°. This allows the flow to be supplied optimally to the first turbine rotor stage. It is particularly favourable here in accordance with the invention when the nozzle guide vanes are integrated in a markedly convergent annular nozzle.

If it is necessary from the structural viewpoint to provide radial struts in the diffuser area, they are designed in accordance with the invention for conservation of angular momentum flow such that they do not affect the flow, so that the flow exiting the compressor at an angle of 45° to 50° can, after passing through the stator vane area and after deflection at an inclination angle of 28° to 32°, preferably 30°, realign by itself in an angular direction in order to flow at an angle between 40° and 50°, preferably 45°, into the inclined burners.

The guide vane area contrived in accordance with the invention is thus designed such that a smaller angular deflection is obtained than in the designs known from the state of the art. This leads to a reduction in the flow losses. It is furthermore possible to reduce the number of stator vanes.

The diffuser area in accordance with the invention is designed as a swirl flow diffuser along the length of which the angle of the flow in front of the guide vane area is restored. This is achieved automatically by a deflection of the flow opposite to the deflection in the guide vane area. The diffuser in accordance with the invention is thus designed without ribs. This means that no flow-guiding elements affecting the flow are provided. The result in accordance with the invention is furthermore that the duct height at the outlet of the diffuser area is considerably larger than in designs known from the state of the art. This leads to an improvement in the flow to the combustion chamber and to the possibility provided in accordance with the invention of using a combustion chamber which is higher in the radial direction.

The following annular flame tube of the combustion chamber has injection nozzles which are inclined at the angle resulting at the outlet from the diffuser area. This angle is preferably 45° relative to the central axis. The heat shields provided inside the burner dome are also inclined at the stated angle. It is possible in accordance with the invention to select and dimension the number of injection nozzles to match the required combustion chamber design concept (lean combustion or rich combustion). It is thus possible in accordance with the invention to obtain a very short but radially extended combustion chamber or a flame tube.

At the outlet of the annular combustion chamber, the nozzle guide vane ring designed in accordance with the invention needs only around half the stator vanes of a conventional combustion chamber, since in accordance with the invention only a much smaller deflection is effected, which is only around 25% of the deflection of the guide vanes in a conventional combustion chamber.

The guide vanes are in accordance with the invention preferably film-cooled and are preferably integrated into a markedly convergent annular nozzle. The latter ensures acceleration of the combustion gases up to the speed of sound level, with the numerically few deflecting turbine stator vanes adapting the flow direction to the following turbine wheel.

Figure 2:
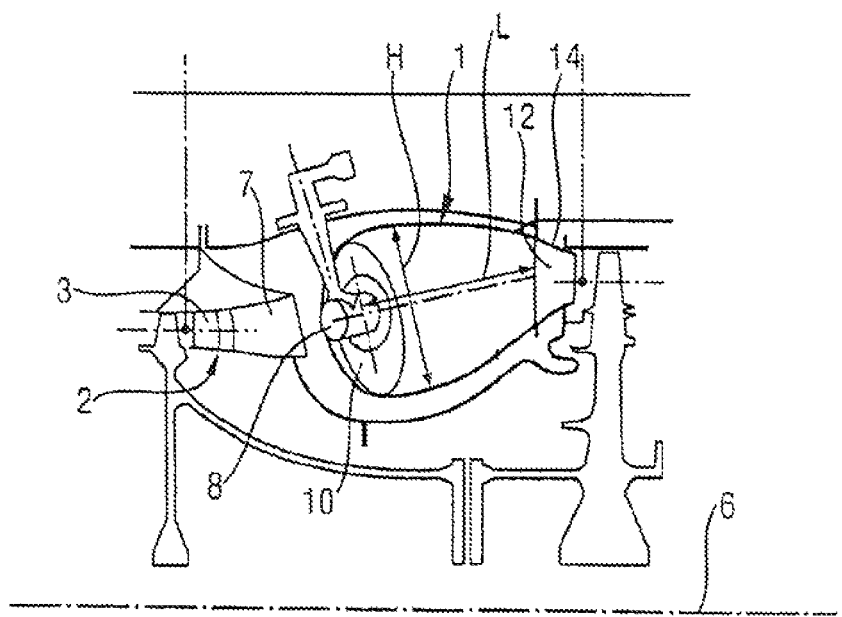
Figure 3:
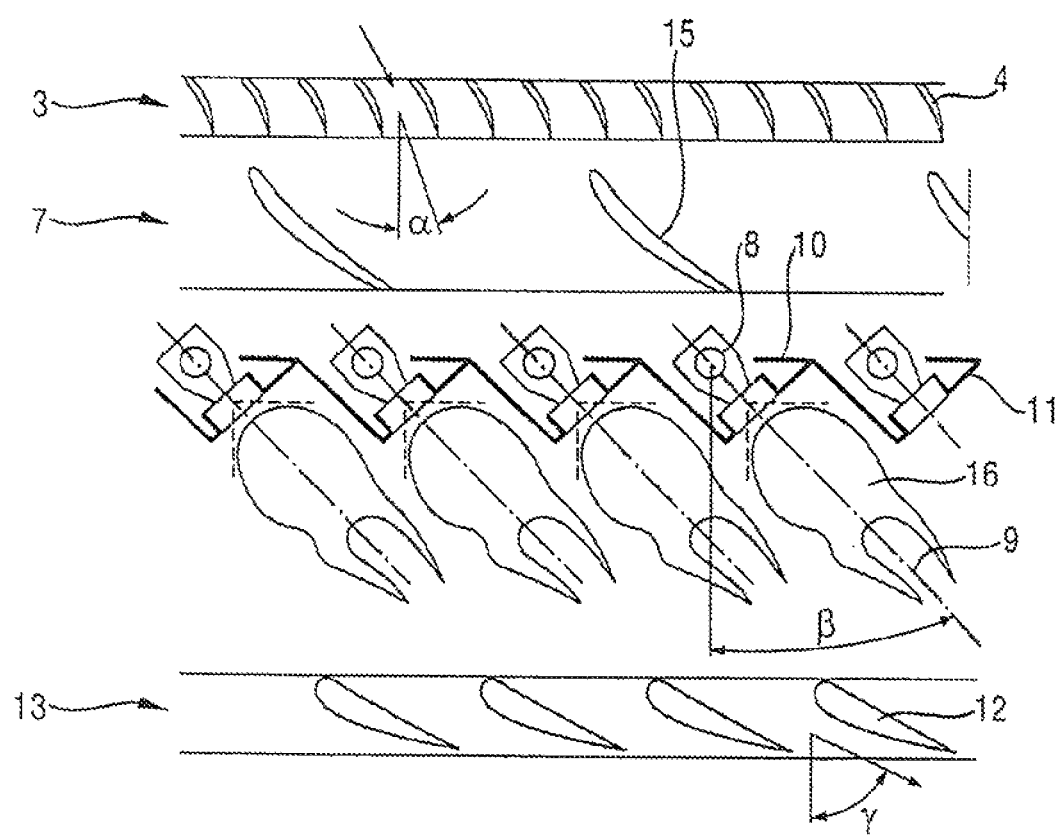

The present invention is described in the following in light of the accompanying drawing showing an exemplary embodiment. In the drawing, FIG. 1 shows a developed sectional view through the gas-turbine combustion chamber arrangement, FIG. 2 shows a sectional view through the annular combustion chamber, FIG. 3 shows a sectional view of a modified exemplary embodiment by analogy with FIG. 1, and FIG. 4 shows a schematic representation of a gas-turbine engine in accordance with the present invention.

The gas-turbine combustion chamber arrangement in accordance with the invention has a flame tube 1. A diffuser element 2 is provided upstream of the flame tube 1 and, as shown in particular in FIGS. 1 and 3, initially includes a guide vane area 3 with guide vanes 4 and a following diffuser area. The guide vanes 4 of the guide vane area 3 are arranged and designed such that they turn a flow 5 entering from a compressor. The redirection is such that the flow when exiting the guide vane area 3 is inclined at an angle $\alpha$ to a central axis 6 of the gas turbine. The angle $\alpha$ is 28° to 32°, preferably 30°.

During passage through the diffuser area 7, the inclination angle of the flow increases again automatically, since it is a swirl flow diffuser, so that the flow is supplied at an angle $\beta$ between 40° and 50°, preferably 45°, to the burners 8. The burners 8 are arranged such that a respective burner axis 9 is also inclined at the angle $\beta$ to the central axis 6. In the same way, the baffle plates at the flame tube inlet 10 and the heat shields 11 as well as the injection nozzles (burners) not shown in detail are also inclined at the angle $\beta$.

The flow exiting the flame tube inlet 10 is supplied in accordance with the invention to a nozzle guide vane ring 13 with nozzle guide vanes 12. Inside the nozzle guide vane ring, there is a further inclination of the flow by an angle between 15° and 20°, preferably 17° (an additional deflection of 17°). The flow thus exits the turbine stator vane ring 13 at an angle $\gamma$ exceeding 65°.

FIG. 2 shows that the nozzle guide vane ring is arranged in the area of an annular nozzle 14. FIG. 2 further shows the increased height H of the flame tube 1 provided in accordance with the invention.

Reference numeral 16 indicates a swirl flame shown schematically.

FIG. 3 shows, unlike in the exemplary embodiment in FIG. 1, a modified example in which additional struts 15 are arranged in the diffuser area 7 which serve only for stabilization and bracing of the diffuser duct, but have no effect on the flow.

As described above, the flow is redirected using the guide vanes 4 by an amount of the opposite deflection in the diffuser area 7, the result being as follows: $\beta-\alpha=20°$. The redirection of the guide vanes 12 results in an angle $\gamma>65°$. The result is: $\gamma-\beta=17°$. The redirection is thus around 17°. The guide vanes 12 therefore additionally deflect the flow by 17° and so take the flow curve at the outlet to an angle of $\gamma=70°$, for example.

Figure 4:
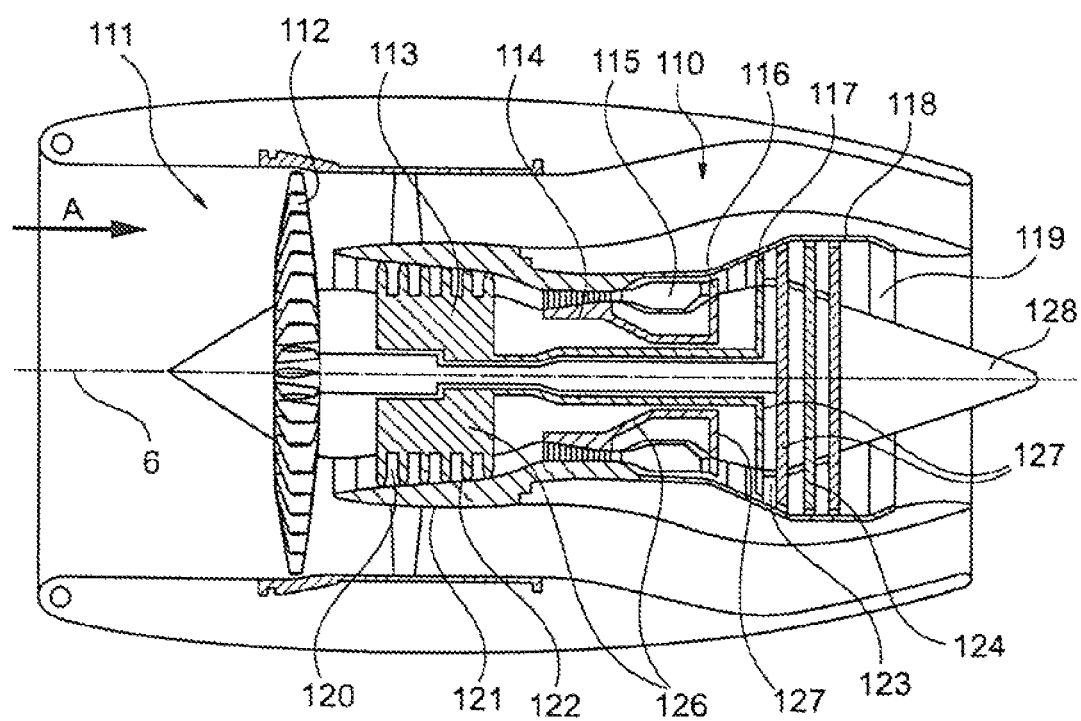

The gas-turbine engine 110 in accordance with FIG. 4 is an example of a turbomachine where the invention can be used. The following however makes clear that the invention can also be used in other turbomachines. The engine 110 is of conventional design and includes in the flow direction, one behind the other, an air inlet 111, a fan 112 rotating inside a casing, an axially operating intermediate-pressure compressor 113, an axially operating high-pressure compressor 114, an axially flown combustion chamber 115, a high-pressure turbine 116, an intermediate-pressure turbine 117 and a low-pressure turbine 118 as well as an exhaust nozzle 119, all of which being arranged about a central engine axis 6.

The axial intermediate-pressure compressor 113 and the axial high-pressure compressor 114 each include several stages, of which each has an arrangement extending in the circumferential direction of fixed and stationary guide vanes 120, generally referred to as guide vanes and projecting radially inwards from the engine casing 121 in an annular flow duct through the compressors 113, 114. The axial compressors furthermore have an arrangement of compressor rotor blades 122 which project radially outwards from a rotatable drum or disk 126 linked to hubs 127 of the high-pressure turbine 116 or the intermediate-pressure turbine 117, respectively.

The turbine sections 116, 117, 118 have similar stages, including an arrangement of fixed guide vanes 123 projecting radially inwards from the casing 121 into the annular flow duct through the turbines 116, 117, 118, and a subsequent arrangement of turbine blades 124 projecting outwards from a rotatable hub 127. The compressor drum or compressor disk 126 and the blades 122 arranged thereon, as well as the turbine rotor hub 127 and the turbine rotor blades 124 arranged thereon rotate about the engine axis 6 during operation.

LIST OF REFERENCE NUMERALS

1 Flame tube
2 Diffuser element
3 Stator vane area
4 Stator vane
5 Entering flow
6 Central axis (engine axis)
7 Diffuser area
8 Injection nozzle of burner
9 Burner axis
10 Flame tube inlet
11 Heat shield
12 Turbine stator vane
13 Turbine stator vane ring
14 Annular nozzle
15 Strut
16 Swirl flame
110 Gas-turbine engine
111 Air inlet
112 Fan rotating inside the casing
113 Axial intermediate-pressure compressor
114 Axial high-pressure compressor
115 Combustion chamber
116 High-pressure turbine
117 Intermediate-pressure turbine
118 Low-pressure turbine
119 Exhaust nozzle
120 Guide vanes
121 Engine casing
122 Compressor rotor blades
123 Stator vanes
124 Turbine blades
126 Compressor drum or disk
127 Turbine rotor hub
128 Exhaust cone

What is claimed is:

1. A gas turbine combustion chamber arrangement, comprising:
   a flame tube;
   a diffuser element arranged upstream of the flame tube in a flow direction, the diffuser element including an annular duct; and
   an axial compressor arranged upstream of the diffuser element;
   the diffuser element including an annular guide vane area having guide vanes for redirecting an incoming flow, the axial compressor configured to provide an inflow to the annular guide vane area at an angle in a range approximately from 45° to 50° in a circumferential direction relative to a central axis of a gas turbine, the guide vanes being provided to reverse the inflow to an angle ($\alpha$) in a range approximately from 25° to 32° in the circumferential direction relative to the central axis of the gas turbine;
   a diffuser area positioned downstream of the guide vane area;
   a plurality of burners arranged in the flame tube, the burners each having axes and being oriented so that the burner axes are positioned at an angle ($\beta$) from 40° to 50° in the circumferential direction relative to the central axis.

2. The gas turbine combustion chamber arrangement of claim 1, and further comprising a flame tube inlet and a heat shield associated with each burner and arranged inclined to the burner axis.

3. The gas turbine combustion chamber arrangement of claim 2, wherein the flame tube is constructed and arranged for the formation of swirl flames.

4. The gas turbine combustion chamber arrangement of claim 3, wherein the flame tube has a length (L) to height (H) ratio of L/H<1.4.

5. The gas turbine combustion chamber arrangement of claim 4, and further comprising, downstream of the flame tube, a nozzle guide vane ring having nozzle guide vanes for deflecting flow entering the nozzle guide vane ring, the nozzle guide vanes provided at an angle in a range from 65° to 70° with respect to the central axis.

6. The gas turbine combustion chamber arrangement of claim 5, and further comprising a convergent annular nozzle, the nozzle guide vanes being integrated in the convergent annular nozzle.

7. The gas turbine combustion chamber arrangement of claim 6, and further comprising struts arranged in the diffuser area.

8. The gas turbine combustion chamber arrangement of claim 1, wherein the flame tube is constructed and arranged for the formation of swirl flames.

9. The gas turbine combustion chamber arrangement of claim 8, wherein the flame tube has a length (L) to height (H) ratio of L/H<1.4.

10. The gas turbine combustion chamber arrangement of claim 9, and further comprising, downstream of the flame tube, a nozzle guide vane ring having nozzle guide vanes for deflecting flow entering the nozzle guide vane ring, the nozzle guide vanes provided at an angle in a range from 65° to 70° with respect to the central axis.

11. The gas turbine combustion chamber arrangement of claim 10, and further comprising a convergent annular nozzle, the nozzle guide vanes being integrated in the convergent annular nozzle.

12. The gas turbine combustion chamber arrangement of claim 11, and further comprising struts arranged in the diffuser.

13. The gas turbine combustion chamber arrangement of claim 1, wherein the flame tube has a length (L) to height (H) ratio of L/H<1.4.

14. The gas turbine combustion chamber arrangement of claim 13, and further comprising, downstream of the flame tube, a nozzle guide vane ring having nozzle guide vanes for deflecting flow entering the nozzle guide vane ring, the nozzle guide vanes provided at an angle in a range from 65° to 70° with respect to the central axis.

15. The gas turbine combustion chamber arrangement of claim 14, and further comprising a convergent annular nozzle, the nozzle guide vanes being integrated in the convergent annular nozzle.

16. The gas turbine combustion chamber arrangement of claim 15, and further comprising struts arranged in the diffuser area.

17. The gas turbine combustion chamber arrangement of claim 1, and further comprising, downstream of the flame tube, a nozzle guide vane ring having nozzle guide vanes for deflecting flow entering the nozzle guide vane ring, the nozzle guide vanes provided at an angle in a range from 65° to 70° with respect to the central axis.

18. The gas turbine combustion chamber arrangement of claim 17, and further comprising a convergent annular nozzle, the nozzle guide vanes being integrated in the convergent annular nozzle.

19. The gas turbine combustion chamber arrangement of claim 1, and further comprising a convergent annular nozzle, the nozzle guide vanes being integrated in the convergent annular nozzle.

20. The gas turbine combustion chamber arrangement of claim 1, and further comprising struts arranged in the diffuser area.

* * * * *